(12) United States Patent
Murphy et al.

(10) Patent No.: US 11,704,384 B2
(45) Date of Patent: *Jul. 18, 2023

(54) SECURE DOCUMENT SHARING

(71) Applicant: AirWatch LLC, Atlanta, GA (US)

(72) Inventors: Gerard Murphy, Lawrenceville, GA (US); Marcos Mendez, Alpharetta, GA (US); Jason McElrath, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/354,229

(22) Filed: Jun. 22, 2021

(65) Prior Publication Data
US 2021/0312010 A1 Oct. 7, 2021

Related U.S. Application Data

(63) Continuation of application No. 14/478,834, filed on Sep. 5, 2014, now Pat. No. 11,061,991.

(51) Int. Cl.
| | |
|---|---|
| *G06F 16/00* | (2019.01) |
| *G06F 16/958* | (2019.01) |
| *G06F 16/93* | (2019.01) |
| *G06F 21/62* | (2013.01) |
| *G06F 40/106* | (2020.01) |
| *G06F 40/154* | (2020.01) |
| *H04L 67/02* | (2022.01) |
| *H04L 67/10* | (2022.01) |

(52) U.S. Cl.
CPC ............ *G06F 16/986* (2019.01); *G06F 16/93* (2019.01); *G06F 21/6209* (2013.01); *G06F 21/6218* (2013.01); *G06F 40/106* (2020.01); *G06F 40/154* (2020.01); *H04L 67/02* (2013.01); *H04L 67/10* (2013.01); *G06F 2221/2141* (2013.01)

(58) Field of Classification Search
CPC ...... G06F 16/986; G06F 16/93; G06F 40/106; G06F 40/154; G06F 21/6209; G06F 21/6218; G06F 2221/2141; H04L 67/02; H04L 67/10
See application file for complete search history.

(56) References Cited

U.S. PATENT DOCUMENTS

| | | |
|---|---|---|
| 8,612,763 B1 | 12/2013 | Axel et al. |
| 8,700,991 B1 | 4/2014 | Gigliotti et al. |
| 2003/0028427 A1 | 2/2003 | Dutta et al. |
| 2003/0028801 A1 | 2/2003 | Liberman et al. |
| 2004/0249487 A1 | 12/2004 | Ahlert et al. |
| 2005/0068582 A1 | 3/2005 | Ferlitsch |

(Continued)

OTHER PUBLICATIONS

"HTML5 Canvas", Oct. 1, 2012, w3schools.com, p. 1.
Remy Sharp, "An introduction to the Canvas 2D API", Aug. 3, 2010, pp. 1-5.

*Primary Examiner* — Hung Q Pham
(74) *Attorney, Agent, or Firm* — Thomas | Horstemeyer, LLP (57) ABSTRACT

Disclosed are various embodiments for sharing documents among users of an enterprise as well as with users external to an enterprise. A document is identified and document components extracted from the document. A browser representation is generated that, when rendered or interpreted by a browser, causes the browser to generate a user interface that presents at least a portion of the document as the document would be viewed by a native viewer.

20 Claims, 8 Drawing Sheets

(56) References Cited

U.S. PATENT DOCUMENTS

| | | |
|---|---|---|
| 2005/0149726 A1 | 7/2005 | Joshi et al. |
| 2007/0038715 A1 | 2/2007 | Collins et al. |
| 2007/0156689 A1 | 7/2007 | Meek et al. |
| 2007/0162749 A1 | 7/2007 | Lim |
| 2009/0254572 A1 | 10/2009 | Redlich et al. |
| 2011/0209193 A1 | 8/2011 | Kennedy |
| 2011/0209196 A1 | 8/2011 | Kennedy |
| 2012/0042387 A1 | 2/2012 | Howard et al. |
| 2012/0203849 A1 | 8/2012 | Collins et al. |
| 2012/0240027 A1 | 9/2012 | Pereira et al. |
| 2012/0240243 A1 | 9/2012 | Allardyce |
| 2013/0179774 A1 | 7/2013 | Wang |
| 2013/0246901 A1 | 9/2013 | Massand |
| 2013/0254401 A1 | 9/2013 | Marshall et al. |
| 2013/0297662 A1 | 11/2013 | Sharma et al. |
| 2014/0075518 A1 | 3/2014 | D Souza et al. |
| 2014/0108792 A1 | 4/2014 | Borzycki et al. |
| 2014/0181528 A1 | 6/2014 | Ram |
| 2014/0189483 A1 | 7/2014 | Awan et al. |
| 2014/0189818 A1 | 7/2014 | Meyer |
| 2014/0212040 A1 | 7/2014 | Walker et al. |
| 2014/0298477 A1 | 10/2014 | Castro et al. |
| 2014/0344420 A1 | 11/2014 | Rjeili et al. |
| 2016/0026827 A1 | 1/2016 | Ko |

Document Share

File  Edit  View  Tools  Help https://secure.document.site/document#33dghrue

This document shared exclusively to John Doe by Jane Doe

Lorem ipsum dolor sit amet, consectetuer adipiscing elit. Aenean commodo ligula eget dolor. Aenean massa. Cum sociis natoque penatibus et magnis dis parturient montes, nascetur ridiculus mus. Donec quam felis, ultricies nec, pellentesque eu, pretium quis, sem. Nulla consequat massa quis enim. Donec pede justo, fringilla vel, aliquet nec, vulputate eget, arcu. In enim justo, rhoncus ut, imperdiet a, venenatis vitae, justo. Nullam dictum felis eu pede mollis pretium. Integer tincidunt. Cras dapibus. Vivamus elementum semper nisi. Aenean vulputate eleifend tellus. Aenean leo ligula, porttitor eu, consequat vitae, eleifend ac, enim. Aliquam lorem ante, dapibus in, viverra quis, feugiat a, tellus. Phasellus viverra nulla ut metus varius laoreet. Quisque rutrum. Aenean imperdiet. Etiam ultricies nisi vel augue. Curabitur ullamcorper ultricies nisi. Nam eget dui. Etiam rhoncus. Maecenas tempus, tellus eget condimentum rhoncus, sem quam semper libero, sit amet adipiscing sem neque sed ipsum. Nam quam nunc, blandit vel, luctus pulvinar, hendrerit id, lorem. Maecenas nec odio et ante tincidunt tempus. Donec vitae sapien ut libero venenatis faucibus. Nullam quis ante. Etiam sit amet orci eget eros faucibus tincidunt. Duis leo. Sed fringilla mauris sit amet nibh.

1

Lorem ipsum dolor sit amet, consectetur adipiscing elit. Cras eu neque lacinia, dapibus ligula sed, pharetra ex. Nam a tristique nibh. Praesent mattis, tortor id ullamcorper gravida, lectus arcu consectetur orci, elementum interdum sem dolor ac nunc. Integer a lectus velit. Donec a sollicitudin est. Quisque congue libero justo, et bibendum odio convallis sit amet. Aliquam imperdiet faucibus pellentesque. Sed sed blandit dui. Quisque accumsan ipsum non ipsum ornare scelerisque.

SECURE DOCUMENT SHARING

CROSS-REFERENCE TO RELATED APPLICATIONS

This application is a continuation of and claims the benefit of U.S. patent application Ser. No. 14/478,834, entitled "SECURE DOCUMENT SHARING" and filed Sep. 5, 2014, which is hereby incorporated by reference in its entirety.

BACKGROUND

Users within an enterprise may have access to certain documents. Users may wish to share documents with other users within the enterprise or outside of the enterprise. Typical document sharing may be facilitated by email or file transfer services or protocols. Once a document is shared by one of these mechanisms, security restrictions can often not be enforced by the sharer of the document upon the user to which the document is shared.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2-6 are example user interfaces generated by a browser based upon a document representation of a document according to various embodiments of the present disclosure.

DETAILED DESCRIPTION

Users in an enterprise environment can be provided with access to documents via a mobile device, personal computer and/or other type of computing device or client device. Users may also wish to share documents with other users who are internal or external to the enterprise. Embodiments of the disclosure can facilitate the sharing of a document with other users via a platform independent document representation of the document, such as a browser representation of the document, where security restrictions can also be associated with the document representation. These security restrictions can be enforced by a server from which the document representation is served to the user. These security restrictions may also be enforced by client-side code that is embedded within the document representation of the document and rendered by a browser. In some embodiments, a document representation may be employed to share or provide a document with another user if or when a compliance rule associated with a user or a device on which the user is attempting to access a particular document specifies that a copy of an actual document should not be provided.

Accordingly, embodiments of the disclosure can operate by obtaining a document in a document file format, which can be an open or proprietary file format, such as a MICROSOFT WORD formatted document, a portable document format (PDF) document, or any other document file format in which a document can be produced and encoded. Upon obtaining such a document, embodiments of the disclosure can extract a platform-independent form of the document, or a document layout as well as a document structure associated with the document. Based upon the document layout and the document structure, a platform independent representation of the document, which is referred to herein as a document representation can be generated and served to the user or device with whom a document is shared. The document representation corresponds to how the document should be rendered or appear to a viewer can be generated and shared with another user. In the following discussion, a general description of the system and its components is provided, followed by a discussion of the operation of the same.

Figure 1:
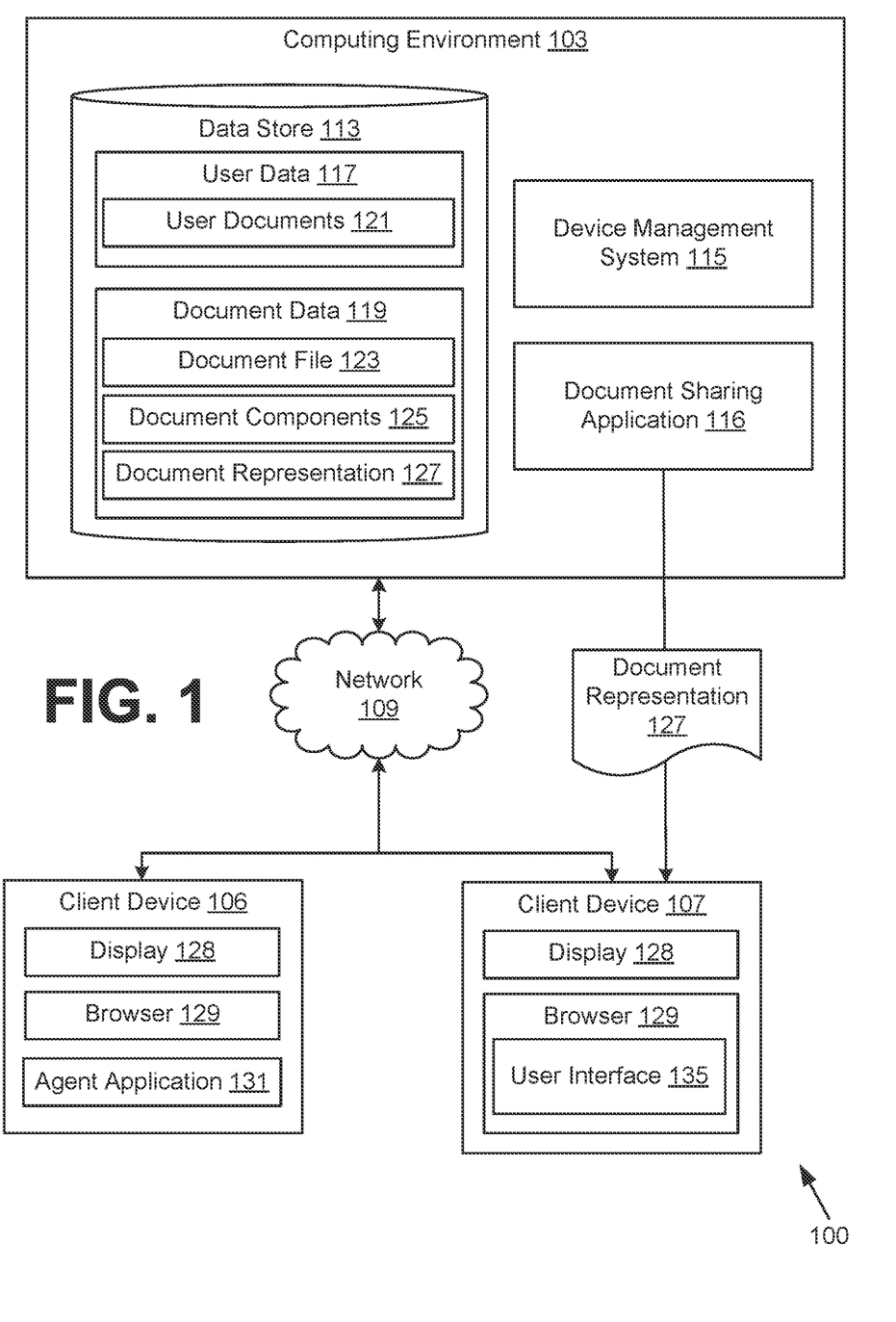
FIG. 1 is a drawing of a networked environment according to various embodiments of the present disclosure.

With reference to FIG. 1, shown is a networked environment 100 according to various embodiments. The networked environment 100 includes a computing environment 103 and a client device 106, and another client device 107, which are in data communication with each other via a network 109. The network 109 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 may comprise, for example, a server computer or any other system providing computing capability. Alternatively, the computing environment 103 may employ a plurality of computing devices that may be arranged, for example, in one or more server banks, computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time. The computing environment 103 may also include or correspond to one or more virtualized server instances that are created in order to execute the functionality that is described herein.

Various systems and/or other functionality may be executed in the computing environment 103 according to various embodiments. Also, various data is stored in a data store 113 that is accessible to the computing environment 103. The data store 113 may be representative of a plurality of data stores 113 as can be appreciated. The data stored in the data store 113, for example, is associated with the operation of the various applications and/or functional entities described below.

The components executed on the computing environment 103, for example, include a device management system 115, a document sharing application 116, and other applications, services, processes, systems, engines, or functionality not discussed in detail herein. The device management system 115 may be executed to manage and/or oversee the operation of multiple client devices 106 that are enrolled within a device management framework facilitated by the device management system 115. For example, an employer may operate the device management system 115 to ensure that the client devices 106 of its employees are operating in compliance with various compliance rules. By ensuring that the client devices 106 of its employees are operated in compliance with the compliance rules, the employer may control and protect access to various data as well as the usage of devices that are potentially issued by the employer. The device management system 115 may also facilitate access to email, calendar data, contact information, documents, or other enterprise data to which an enterprise may wish to provide access by users via client devices 106.

The computing environment 103 may also execute a document sharing application 116 that facilitates the sharing of documents between users within an enterprise as well as to users who are external to the enterprise. The document sharing application 116 can receive or identify a document that a user of the enterprise desires to share with another user and generate a document representation of the document. The document representation of the document can also be associated with a security restriction that restricts use of the content of the document in some form. As will be described herein, a security restriction associated with a document representation can take various forms, such as a restriction on the ability of a user to whom the document is shared to copy, print, disseminate or otherwise use the document in contravention of the security restrictions. In the context of this disclosure, a document may also be shared by a user in the sense that the user attempts to access a copy of a document that is stored within the computing environment 103 via a client device 106, 107 using an application configured to facilitate access to a storage account of the user within the enterprise.

The data stored in the data store 113 includes, for example, user data 117, document data 119, and potentially other data. The user data 117 can include data associated with a user account, such as user documents 121, mailbox data, calendar data, contact data and other user profile information. User documents 121 can include documents or references to documents that are associated with a user account that a user may create, edit as well as potentially share with other users within or outside of the user's organization. User documents 121 can be stored in a content storage system in which the user is allotted space, such as an enterprise content management or document management system in which users can store files on one or more network drives in a storage account that is associated with the user. User documents 121 can also be uploaded to the data store 113 via the document sharing application 116 when a user desires to share a particular document with another user.

As noted above, a user document 121 can be a reference to a document, which can be stored as document data 119 in the data store 113. The document data 119 can include the document file 123, which can be one or more of various document file formats. For example, a user document 121 can be authored and saved in a proprietary or open file format. For example, a document file 123 can be authored using the MICROSOFT WORD word processor and saved in a file format that is specific to the word processor or in an open file format that can be interpreted by the word processor. As another example, a document file 123 can be authored using the ADOBE PHOTOSHOP photo editing software and stored in a file format that is specific to the photo editing software. As yet another example, a document file 123 can comprise a PDF file is created via the ADOBE ACROBAT document creation software and saved in the PDF format. The above examples are merely illustrative and are not meant to comprise an exhaustive list of file formats. It should be appreciated that a document file 123 can be created, authored, edited and/or stored in various other types of open and proprietary file formats.

Document components 125 can include a document layout as well as a document structure associated with a particular document file 123. Document components 125 can also include any other components of a document that can be extracted from the document file 123 and from which the content and layout of a particular document can be determined. In other words, the document components 125 can represent a platform-independent version of the document from which a document representation 127 can be generated by the document sharing application 116 or an application executed by a client device 106, 107 with which the document components 125 are shared. The document components 125 can be generated by the document sharing application 116 or any other application or process. For example, a document layout can describe a visual layout of a document, or how content of a particular document is laid out when viewed by a user. In other words, the document layout can describe the look of a document and how the content of the document is formatted as well as positioned when the document is viewed or printed by a user. The document layout can also include information such as fonts used in the document, the location of text and images on particular pages of the document, and other layout-related information. The document structure can describe the logical structure of a particular document. For example, the document structure can include the text of a document as well as how the text of the document is segmented into multiple paragraphs, sections or other indicia of structure. The document structure can also include actual images or other content that comprise a particular document. Correspondingly, again, the document layout specifies how the various textual components, images and other media comprising a document are displayed when the document is rendered by a viewer application or process.

A document representation 127 of a document can be generated by the document sharing application 116 from the document components 125, or, in one embodiment, from the document structure and document layout. The document representation 127 can comprise one or more web pages hosted by the computing environment 103 and served to a client device 106, 107 via a web server that is provided by the document sharing application 116 or another server process. The document representation 127 allows a document to be shared by a user to another user such that when rendered by a browser application a content rendering application, or any other application executed by a client device 106, 107 other than a native viewer associated with the document file format, the document representation 127 allows a document to be viewed as the document is formatted as specified by the document layout. In other words, the document representation 127 represents a converted form of a particular document generated by the document sharing application 116 that facilitates viewing of the document as the document would be rendered in a native viewer or editor associated with the document file format. Accordingly, the document representation 127 can comprise hypertext markup language (HTML) elements along with references to text, images, or other media such that when rendered by a browser, a user interface that displays the document is generated by a client device 106, 107.

User data 117 can also include access settings, such as authentication credentials, delegation settings (e.g., information about other users who may be provided access to the user data 117 of a particular user), mail and document retention rules and/or policies, and/or other geographic access restrictions or limitations (e.g., information about certain locations and/or networks from which user data 117 can be accessed). User data 117 can also include other account settings, such as biographical or demographic information about a user, password reset information, multi-factor authentication settings, and other data related to a user account as can be appreciated.

User documents 121 can also include references to media or other types of files that are stored in a data store 113 via a web-based interface or any other file upload or file synchronization application in accordance with various embodiments of the present disclosure. A client device 106 can be configured to access such resources that are stored in or on the client device 106, in a data store 113 or any other location via any type of application that is executed by the client device 106, and the depicted example is but one example.

In some embodiments and examples, user data 117 may also include compliance rules that are enforced by one or more applications executed by a client device 106 and/or the device management system 115. In this sense, compliance rules can be stored on the data store 113 and/or on the client device 106 and represent requirements with which a user and/or a client device 106 must comply in order to access user data 117 via the computing environment 103 or access the network 109.

In one embodiment, compliance rules can specify one or more conditions that must be met in order for a particular user and/or client device 106, 107 to access a copy of document file 119. A compliance rule can specify a condition with respect to a client device 106, 107, a property of a request to share a particular document and/or a property of the document itself as well as an action that should be taken with respect to the condition.

For example, a compliance rule can specify that a client device 106, in order to access a user document 121, a document representation 127 of the user document 121, user data 117 and/or the network 109, must execute a particular version of an operating system, a browser or any other application. As another example, a compliance rule may specify that in order to access a user document 121, a document representation 127 of the user document 121, user data 117 and/or the network 109, a client device 106 must do so from within a particular geographic location and/or via a particular network. A compliance rule may also specify certain time windows during a particular day, week, month or year during which a client device 106 is authorized to access a user document 121, a document representation 127 of the user document 121, user data 117 and/or the network 109.

Another example of a compliance rule may comprise a requirement that an operating system of the client device 106 be unmodified with respect to root access or superuser privileges available to the user. For example, certain mobile devices and/or mobile devices may be shipped with restrictions or limitations regarding root access or superuser privileges. In other words, such access may be unavailable to the user. However, certain users may employ exploits related to software and/or hardware of the client device 106 in order to gain root access or superuser privileges with respect to the client device 106. Accordingly, a compliance rule specified by a network administrator may require that such a restriction or limitation on root access or superuser privileges remain in place with respect to a client device 106 in order for the client device 106 to access a user document 121, a document representation 127 of the user document 121, user data 117 and/or the network 109.

A compliance rule can specify that the client device 106 and/or other employ a certain encryption protocol or procedure. For example, a compliance rule may specify that the client device 106 employ data at rest encryption for certain data stored on the client device 106. As another example, a compliance rule may specify that a client device 106 and/or an application executed by the client device should periodically communicate with or "ping" the device management system 115 and/or another application or service within a specified amount of time relative to a previous communication or ping. In other words, the compliance rule can specify that the client device 106 periodically "check in" with the device management system 115 or another server process.

Another compliance rule may specify that certain applications may not be installed on a client device 106 in order for the client device 106 to be permitted to access user data 117. For example, certain applications may be identified as malicious applications or unauthorized applications. Accordingly, if such an application is detected to be installed on the client device 106, a compliance rule may specify that such a client device 106 is not permitted to access a user document 121, a document representation 127 of the user document 121, user data 117 and/or the network 109. Alternatively, a compliance rule may also require that one or more applications be installed on the client device 106 in order for the client device 106 to be permitted to access a user document 121, a document representation 127 of the user document 121, user data 117 and/or the network 109. For example, certain applications may be identified as required applications by an administrator. Accordingly, if such an application is not detected to be installed on the client device 106, a compliance rule may specify that such a client device 106 is not permitted to access a user document 121, a document representation 127 of the user document 121, user data 117 and/or the network 109.

A compliance rule may also specify parameters with respect to password complexity, and if a password corresponding to a user fails to possess a minimum password complexity, the device management system 115 and/or a locally executed process can restrict or remove access to a user document 121, a document representation 127 of the user document 121, user data 117 and/or the network 109. Another compliance rule may relate to a maximum number of failed login and/or unlock code entry attempts, and if the agent application 131 detects that this number of attempts has been exceeded, the agent application 131, document sharing application 116 and/or device management system 115 can remove access to a user document 121, a document representation 127 of the user document 121, user data 117 and/or the network 109.

Additionally, certain compliance rules may be enforced depending upon the location of the client device 106. For example, certain compliance rules may be triggered when the location of the client device 106 is detected to be within or outside of a certain geographic area or when the client device 106 is connected to a particular network 109. In such a scenario, the agent application 131, document sharing application 116 and/or device management system 115 can remove access to a user document 121, a document representation 127 of the user document 121, user data 117 and/or the network 109 when a compliance rule is violated and when a particular property regarding the location of the client device 106 can be detected. A location property can be detected via a global positioning system or other location detection capability of the device and/or when the client device 106 is in a particular data roaming state.

Additionally, one or more compliance rule may specify an action that should be taken when a violation of a compliance rule is detected or another condition is detected. For example, if a particular client device 106, 107 is located within or outside a particular geographic area or in a particular data roaming state, a compliance rule can specify that the client device 106, 107 is authorized access a document representation 127 of the document rather than a copy of the document file 123 itself. Alternatively, if a particular client device 106, 107 complies with the various compliance rules, the document sharing application 116 can allow the client device 106, 107 to access a copy of a particular document file 123.

In some embodiments, a compliance rule can specify whether one or more of the security restrictions should be applied to a particular document representation 127 prior to providing the document representation 127 to a user or client device 106, 107 to which a document is shared. For example, in one instance, a user may access or share a document within a corporate network without a particular document being accessed outside of a corporate firewall. In such a scenario, a less stringent set of security restrictions may be applied to a document representation 127. In another instance, the same document may be accessed or shared outside of the corporate network or outside of the corporate firewall. In this scenario, more stringent security restrictions can be applied, such as printing restrictions, content redaction, copying restrictions, etc.

Compliance with compliance rules may be determined by a process executed by the client device 106, by the device management system 115, the document sharing application 116, by a combination of the device management system 115 and a locally executed process, or by another process that is executed on another computing device. For example, a document representation 127 of a document rendered by the client device 106 can include code executed by a browser that submits a request to the document sharing application 116 requesting that the document sharing application 116 determine whether the client device 106 is in compliance with compliance rules. The document sharing application 116 can make such a determination and determine whether to remove or restrict access to a user document 121, a document representation 127 of the user document 121, user data 117 and/or the network 109. Additionally, compliance may be determined by a combination of the agent application 131 and/or the device management application 115 or document sharing application 116. For example, compliance with certain compliance rules may be determined locally on the client device 106, while others may require or may be more efficiently determined by the device management system 115 and/or document sharing application 116.

The client device 106 and client device 107 are representative of a plurality of client devices that may be coupled to the network 109. The client device 106, 107 may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 106, 107 may include a display 128 that comprises, for example, one or more devices such as liquid crystal display (LCD) displays, gas plasma-based flat panel displays, organic light emitting diode (OLED) displays, LCD projectors or other types of display devices.

The client device 106, 107 may be configured to execute various applications, such as a content rendering application 129, an agent application 131, and/or other components. In this respect, the client device 106 represents a device executing an agent application 131 and/or a device that is enrolled within a device management framework associated with an enterprise. A client device 107 represents a device associated with a user who may be external to the enterprise or a device that is not enrolled within the device management framework of the enterprise. The content rendering application 129 content rendering application 129 may be executed to obtain and render a document representation 127 to generate user interfaces 135 based upon the document representation 127 transmitted from the document sharing application 116, the device management system 115 and/or any other process or server. The content rendering application 129 can include, for example, a browser, a special purpose application configured to facilitate the browsing of documents available via the data store 113, or any other type of application that can render a document representation 127. A user interface 135 can be rendered by the content rendering application 129 from a document representation 127 that corresponds to a particular user document 121 shared by a first user to another user via the document sharing application 116.

The agent application 131 may be executed on the client device 106 to oversee, monitor, and/or manage at least a portion of the resources for the client device 106. The agent application 131 may be executed by the client device 106 automatically upon startup of the client device 106. Additionally, the agent application 131 may run as a background process in the client device 106. In other words, the agent application 131 may execute and/or run without user intervention. Additionally, the agent application 131 may communicate with the device management system 115 in order to facilitate the management of the client device 106 by the device management system 115.

Next, a general description of the operation of the various components of the networked environment 100 is provided. To begin, the document sharing application 116 can obtain a request from a user of an enterprise to share a particular document with another user of the enterprise or a user who is external to the enterprise. Such a request can be initiated by a user interface, such as a web page, that is generated by the document sharing application 116 and presented to a user of the enterprise. A user may also enter a destination to which the document should be shared, such as with an email address of another user, a phone number, a social media identifier, a username of another user within the enterprise, or any other form of user identifier.

Upon obtaining such a request from a user to share a particular user document 121 with another user, the document sharing application 116 can extract the document components 125, such as a document layout as well as a document structure, from the document file 123 corresponding to the user document 121. Based upon the document components 125, the document sharing application 116 can generate a document representation 127 of the document file 123. The document sharing application 116 can also include one or more security restrictions that restrict use of the content of the document by a user to whom the document representation 127 is provided. Upon creating the document representation 127, the document sharing application 116 can transmit a reference to the document representation 127 to a destination associated with the request to share the document. Such a reference can include a hyperlink that allows a user to whom the reference is sent to access the document representation 127 of the document via a client device 107. In some embodiments, such a hyperlink can be unique to the request to share the document with respect to other hyperlinks generated by the document sharing application 116. The document representation 127 can then be rendered by a content rendering application 129 executed by the client device 107 to generate a user interface 135 that is displayed by the client device 107.

The document representation 127 of a particular document can be generated by employing various approaches. In a first approach, the document sharing application 116 can generate the document representation 127 by extracting the document components 125 of a document, such as a document layout and document structure, so that the content and layout of the document can be determined. Upon determining a content and layout of the document, the document sharing application 116 can then generate, for example, an HTML representation of the document by employing HTML elements that facilitate drawing of content in a browser window in which the document representation 127 is rendered. As one example, the HTML elements can include an HTML5 canvas element along with accompanying client-side code that is interpreted and executed by the content rendering application 129. The client-side code directs how the browser should draw content within a user interface 135 displayed by the content rendering application 129 in the client device 107. For example, such client-side code can include scripting code, such as JavaScript code, that is specified under the HTML5 canvas element standard to draw text and/or two-dimensional graphics content within a browser window.

Accordingly, because the document components 125 are extracted from the document file, the document sharing application 116 can generate one or more HTML pages that include elements, such as the HTML5 canvas element or any other HTML that facilitates the rendering of two-dimensional graphics within a browser user interface, that draw the document as specified by the document layout and incorporating the content of the document (e.g., text, images, etc.) as specified by the document structure. Because the document layout specifies the various fonts used in the document, the HTML elements and client-side scripting code included in the document representation 127 can direct textual elements to be drawn using the same font as were specified in the original document file 123. Additionally, because the document structure includes images that are used within the document, the HTML elements and scripting code can also direct the images to be drawn by the content rendering application 129 rendering the document representation 127 of the document. In one embodiment, the document representation 127 can include a web page that includes HTML elements and scripting code directing the browser to draw only a portion of a document that is being viewed within a user interface 135 rendered by the content rendering application 129 and request additional portions of the document as the user navigates through the document or provides navigation input.

A second approach to generating a document representation 127 of a particular document by the document sharing application 116 can involve conversion of a particular document, or portions of the document, to one or more images based upon the document layout and document structure. In this way, the document sharing application 116 can create a document representation 127 that includes images, or screenshots, representing the document. In one embodiment, the document representation 127 can include a web page that includes client-side code that references one or more images corresponding to a portion of a document that is being viewed within a user interface 135 rendered by the content rendering application 129. Accordingly, in some embodiments, the document representation 127 generated by the document sharing application 116 can split a particular page of a document into multiple images that are referenced by the document representation 127 and rendered by the content rendering application 129 when viewed. In this way, the document representation 127 can also reuse images that correspond to certain portion of a document that may remain unchanged across multiple pages of a document, such as a header or a footer of a document, while requesting images from the document sharing application 116 that correspond to the body of the document, which is likely to change across multiple pages of the document.

A third approach to generating a document representation 127 of a particular document by the document sharing application 116 can involve transmitting the document components 125 of the document along with client-side code that can instruct an application, such as a browser or the content rendering application 129, with respect to how the platform-independent version of the document should be rendered on a particular client device 107. In this scenario, the document components 125 comprise data describing the structure and layout of a document. In one embodiment, when a user activates a hyperlink to a reference of the document components 125 associated with a request to share a document, the hyperlink can include a page comprising JavaScript code or other client-side scripting language code that determines a browser version, a display device, a display resolution and other properties of the client device 107.

In response to making such determinations, the client-side code can then render the document from the document components 125 in a form that is tailored to the properties of the device display, an application rendering the document components 125 or other capabilities of the device. For example, the client-side code can render for a device having a higher resolution display a high resolution version of a document from the document components 125. As another example, the client-side code can render a text-only version of a document from the document components 125 on client devices 107 having extremely low resolution devices.

Another approach to generating a document representation 127 of a particular document by the document sharing application 116 can involve generating an extensible markup language (XML) document object model (DOM) that represents the document representation 127. In this scenario, the XML DOM can describe the layout and content of a particular document which can then be rendered on a client device 106, 107. Yet another approach to generating a document representation 127 of a particular document by the document sharing application 116 can involve generating a rich text or a plain text version of a particular document that can be transmitted to the client device 106, 107. In some embodiments, the document representation 127 can comprise a browser specific version of a document, such as a version of the document with an accompanying style sheet defining a particular display layout tailored for mobile devices, tablet devices, or other types of devices.

In any approach to generating a document representation 127, the document representation 127 can include client-side code, such as scripting code (e.g., JavaScript code) that is executed by a content rendering application 129 rendering the document representation 127. The client-side code can request a portion of the document being viewed within the user interface 135 at any given point in time. In other words, as a user viewing a document on the client device 107 navigates, by providing navigation input, through a document, the client-side code associated with the document representation 127 can request a particular portion of the document to which the user is navigating. For example, if the user scrolls downward through a document, the client-side code can request a subsequent page or a subsequent portion of a page from the document sharing application 116, which can provide images or HTML5 canvas code that corresponds to content in the requested portion of the document. In this way, the document representation 127 may include only a subset of the content of a particular document that is shared rather than all of a particular document.

As noted above, the document representation 127 can include one or more security restrictions that restrict use of the content of a document represented by a document representation 127. In some embodiments, a user sharing a particular document with another user can specify certain restrictions that should be included with a particular document. For example, in one instance, a user may wish to share a document with another user as well as restrict or disable copy or cut capability of the content rendering application 129 with respect to content of the document as well as disable the printing functionality of the content rendering application 129. In another instance, the user may wish to share a document with another user and restrict or disable copy or cut capability of the content rendering application 129 with respect to content of the document but allow the document to be printed without restrictions. In either scenario, the document sharing application 116 can allow the sharing user to select which restrictions should be associated with a particular document representation 127 that is provided to another user or destination with which a particular document is shared.

One example of a security restriction that can be associated with a document is the disabling or restricting of a copy function or a cut function (i.e. copying content to a clipboard) associated with content rendered from the document representation 127 and displayed in the user interface 135 on the client device 107. In this scenario, the document representation 127 can include client-side code, such as JavaScript code, that restricts or disables the ability of a user via the client device 107 to activate a copy function and/or activate a contextual menu, such as via a "right click" or secondary mouse click. In some embodiments, in response to detecting an attempt by the user to activate a copy function or a secondary mouse click, the client-side code can display a warning indicating that the copy function has been disabled or restricted by the sharer of the document.

Another example of a security restriction that can be associated with a document representation 127 comprises incorporating a watermark layer along with the content of the document that is being shown in the user interface 135. Such a watermark layer can be overlaid onto the document content or placed in a visible layer beneath the content of the document. In some embodiments, document representation 127 can include code that references the watermark layer and/or causes the watermark layer to be rendered along with the content of the document shown in the user interface 135. In one embodiment, the watermark layer can comprise a unique watermark that can be associated with the destination to which the document is shared. In this way, should the document be printed and/or captured from the user interface 135 and then redistributed, a presence of a unique watermark layer may facilitate tracing of a source of an unauthorized redistribution of the document. In some embodiments, such a unique watermark layer can comprise barcodes or quick-response codes (e.g. QR codes), numerical identifiers, or other identifiers that are embedded within the document. A unique watermark layer can also comprise a watermark layer that includes one or more lines, arcs or other shapes that are overlaid onto the document within the user interface 135 that form a unique pattern that can be identified should the document be photographed, printed or otherwise redistributed without authorization.

Another example of a security restriction that can be associated with a document representation 127 comprises restricting printing functionality of a content rendering application 129. The document representation 127 can be accompanied by client-side code that can restrict or hinder the ability of a user to print content of a document associated with document representation 127. In one embodiment, the document representation 127 can be accompanied by a cascading style sheet (CSS) that identifies a print layout that differs from a screen layout, where the print layout obfuscates or omits textual content or image content of the document associated with the document representation 127. In some embodiments, the document representation 127 can include client-side code interpreted by the content rendering application 129 that restricts the printing function associated with a content rendering application 129.

Another example of a security restriction comprises a code integrity check that can be performed on the client-side code associated with a document representation 127. The code integrity check can be performed on HTML elements or client-side code accompanying a document representation 127 that calculates a checksum with respect to the document representation 127 to detect whether modification of the HTML elements or client-side code rendered or interpreted by a content rendering application 129 has occurred. Such modification may occur in order to circumvent a security restriction associated with a document. For example, the document representation 127 can include client-side code that calculates a cyclic redundancy check (CRC) code on the document representation 127 that is requesting document content from the document sharing application 116, and if the CRC code fails to match an expected value associated with the particular document representation 127 that is stored on the data store 113, the document sharing application 116 can deny the request for document content from a particular client device 107.

Certain security restrictions can be enforced by the document sharing application 116 or by the server. For example, access to a hyperlink associated with a particular document representation 127 of a certain document can be password protected. In some embodiments, access to the document representation 127 can be restricted to client devices 106 that are enrolled with the device management system 115 and that are also executing the agent application 131. Additionally, the document representation 127 can also be restricted to those devices that are in compliance with compliance rules specified by a system administrator. For example, the agent application 131 can provide a geographic location of a particular client device 106, and a security restriction associated with a document may specify that the document is only available for retrieval by the client device 106 when the client device 106 is located within a certain geographic location or connected to a particular network 109. A security restriction may also specify that the client device 106 should be in compliance with any other compliance rule associated with the device management system 115 in order for the document sharing application 116 to provide access to a document representation 127 associated with a particular document. In some embodiments, a compliance rule with respect to device location may be enforced with respect to a client device 107 by obtaining location data from the content rendering application 129 executed by the client device 107.

Another example of a security restriction associated with a document representation 127 can comprise redaction of certain content within a document. For example, the document sharing application 116 can redact certain sensitive content from a document prior to or in conjunction with generating a document representation 127 of a particular document. In one embodiment, the document sharing application 116 can redact textual content that matches a particular regular expression or alphanumeric pattern. For example, textual content that matches a regular expression corresponding to a social security number, credit card number, phone number or other regular expressions can be redacted from document representation 127. As another example, the document sharing application 116 can redact or remove text that follows or accompanies certain keywords, such as "confidential," "secret," or other keywords that provide an indication of sensitive content that should not be redistributed.

Figure 2:
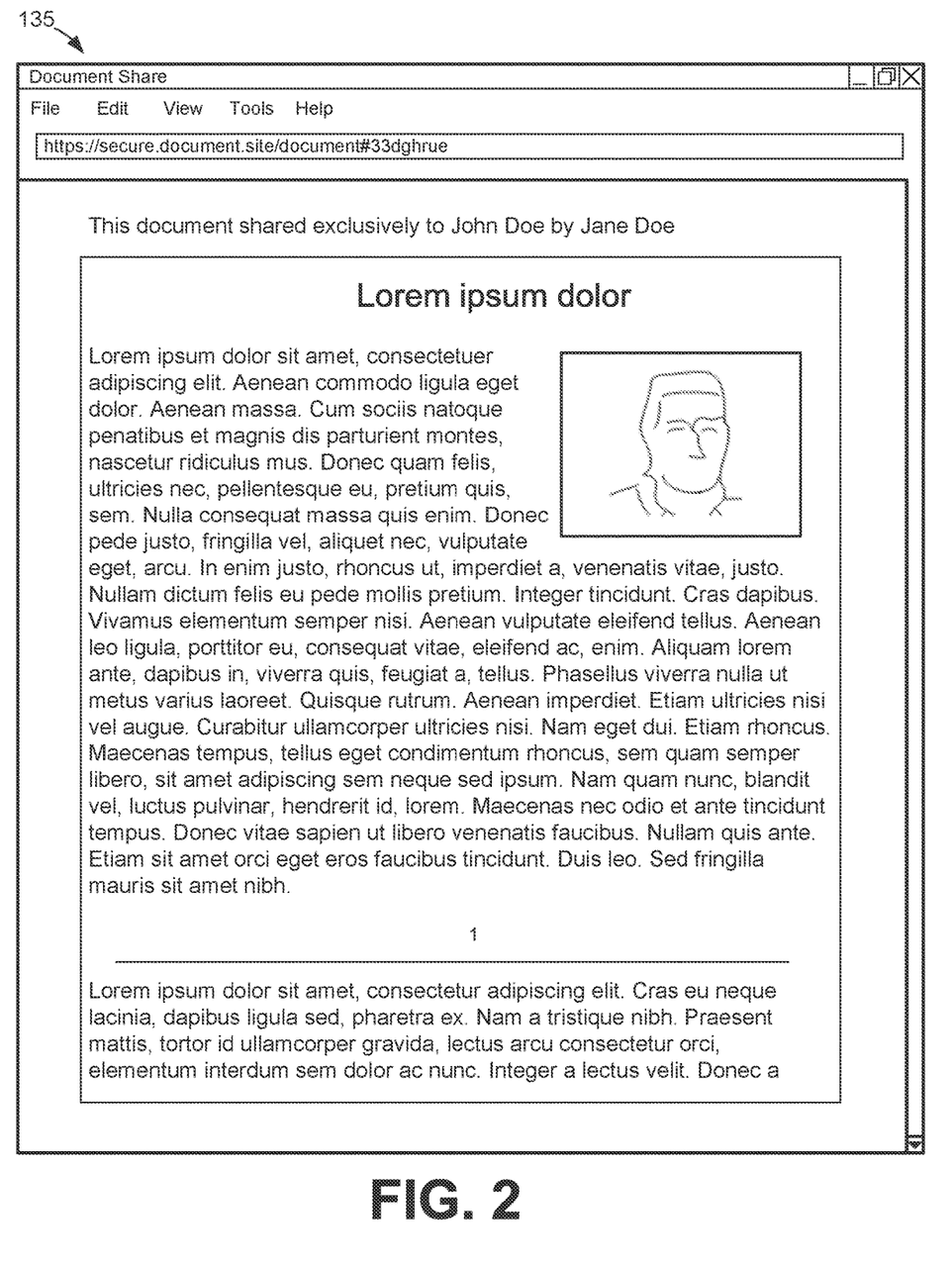

Referring next to FIG. 2, shown is an example user interface 135 that can be rendered by a content rendering application 129 executed by a client device 106, 107 according to various embodiments of the disclosure. The user interface 135 corresponds to a document representation 127 rendered by the content rendering application 129 in response to the sharing of a document by one user to another user via the document sharing application 116. As shown in the example of FIG. 2, the document representation 127, when rendered by a content rendering application 129, causes at least a portion of the content of a particular document to be displayed within the user interface 135. As also shown in FIG. 2, the document representation 127 can be based upon the document layout and document structure of a particular document file 123 extracted from the document by the document sharing application 116.

Continuing the example of FIG. 2, reference is now made to FIG. 3, which illustrates another example user interface 135 that can be rendered by a content rendering application 129 executed by a client device 106, 107 according to various embodiments of the disclosure. The user interface 135 shown in FIG. 3 also corresponds to the document representation 127 rendered by the content rendering application 129 in response to the sharing of a document by one user to another user via the document sharing application 116. In the example of FIG. 3, the user has navigated to a different portion of the document shown in region 201. Accordingly, as noted above, the document representation 127 can comprise client-side code, or scripting language that is interpreted by the content rendering application 129 that causes the content rendering application 129 to request an additional portion of the document so that it may be rendered within the user interface 135.

Figure 4:
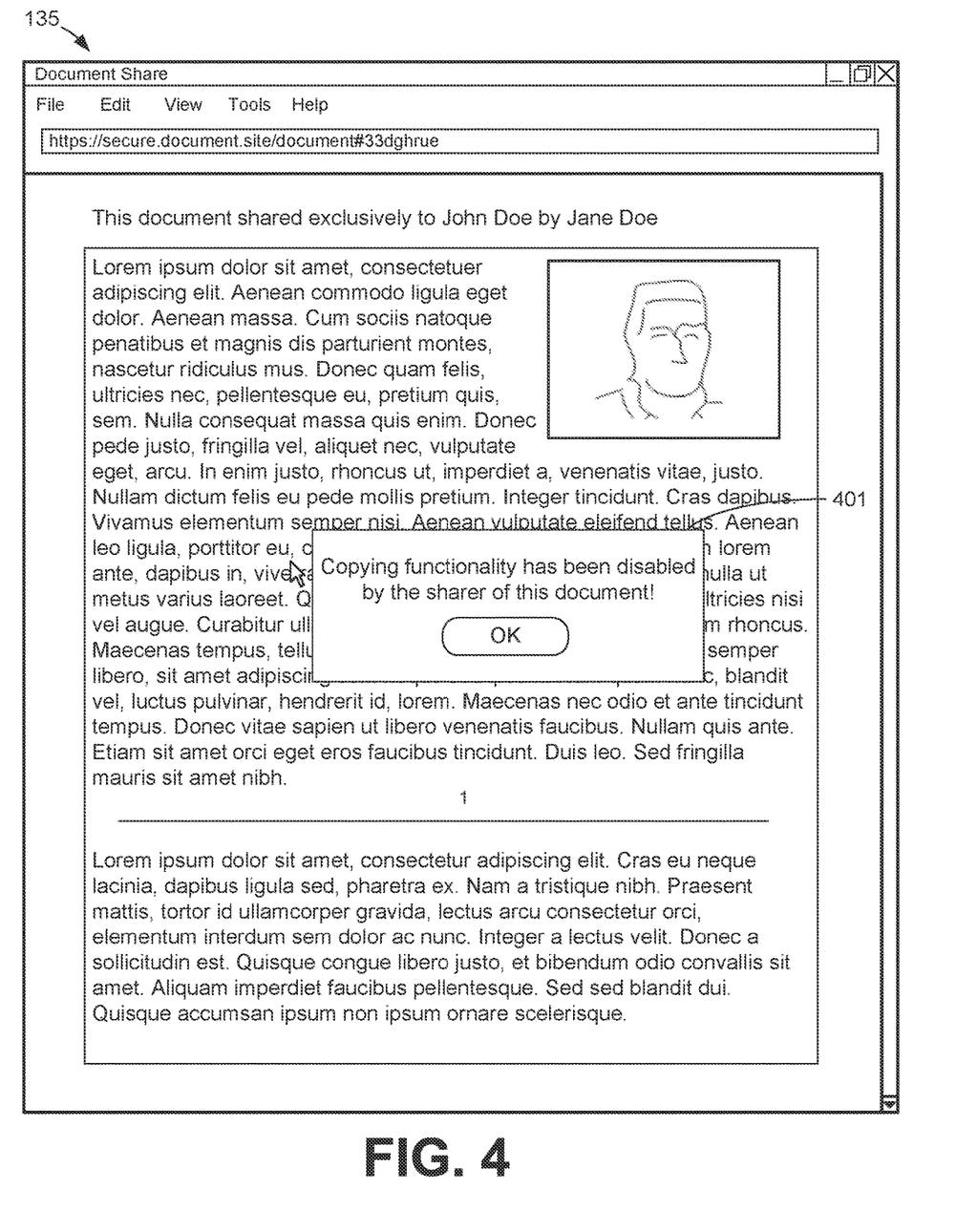

Continuing the example of FIG. 3, reference is now made to FIG. 4, which illustrates another example user interface 135 that can be rendered by a content rendering application 129 executed by a client device 106, 107 according to various embodiments of the disclosure. The user interface 135 shown in FIG. 4 also corresponds to the document representation 127 rendered by the content rendering application 129 in response to the sharing of a document by one user to another user via the document sharing application 116. The example of FIG. 4 illustrates an example of a security restriction that may be associated with the document representation 127 of a document that is rendered by a content rendering application 129.

In the example shown in FIG. 4, the document representation 127 can include client-side code, such as JavaScript code, that restricts or disables the ability of a user to activate a copy function and/or activate a contextual menu, such as via a "right click" or secondary mouse click. In response to detecting an attempted activation of a copy function or a particular mouse click, the client-side code displays a warning 401 that is rendered within the user interface 135 that also indicates that the copy function has been disabled or restricted by the sharer of the document associated with the document representation 127.

Figure 5:
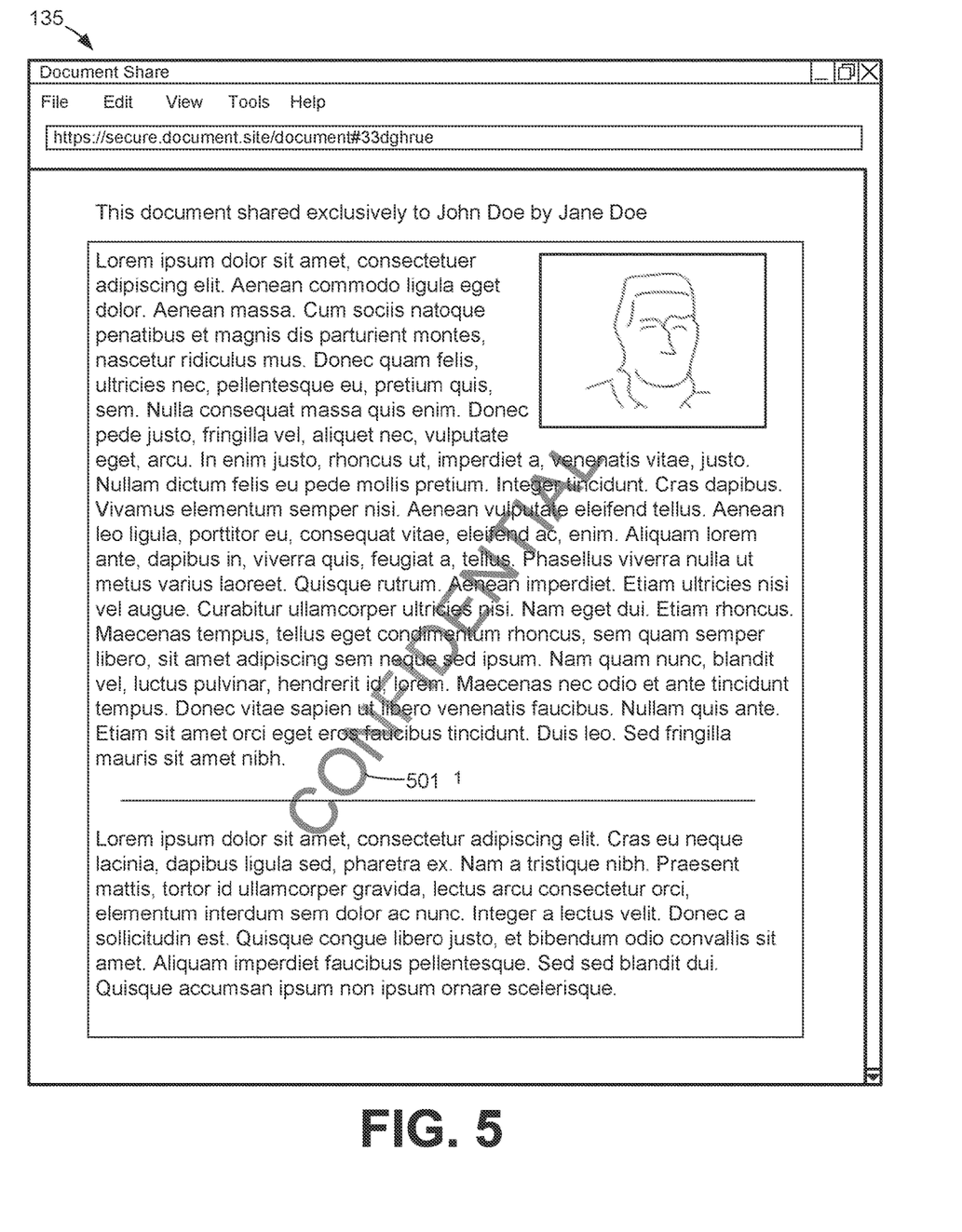

Continuing the example of FIG. 4, reference is now made to FIG. 5, which illustrates another example user interface 135 that can be rendered by a content rendering application 129 executed by a client device 106, 107 according to various embodiments of the disclosure. The user interface 135 shown in FIG. 5 also corresponds to the document representation 127 rendered by the content rendering application 129 in response to the sharing of a document by one user to another user via the document sharing application 116. The example of FIG. 5 illustrates an example of a security restriction that may be associated with the document representation 127 of a document that is rendered by a content rendering application 129. FIG. 5 illustrates an example of a watermark layer 501 that is incorporated along with the content of the document that is being shown in the user interface 135. The watermark layer 501 is overlaid onto the document content that is shown in the user interface 135 rendered by the content rendering application 129 corresponding to the document representation 127.

Figure 6:
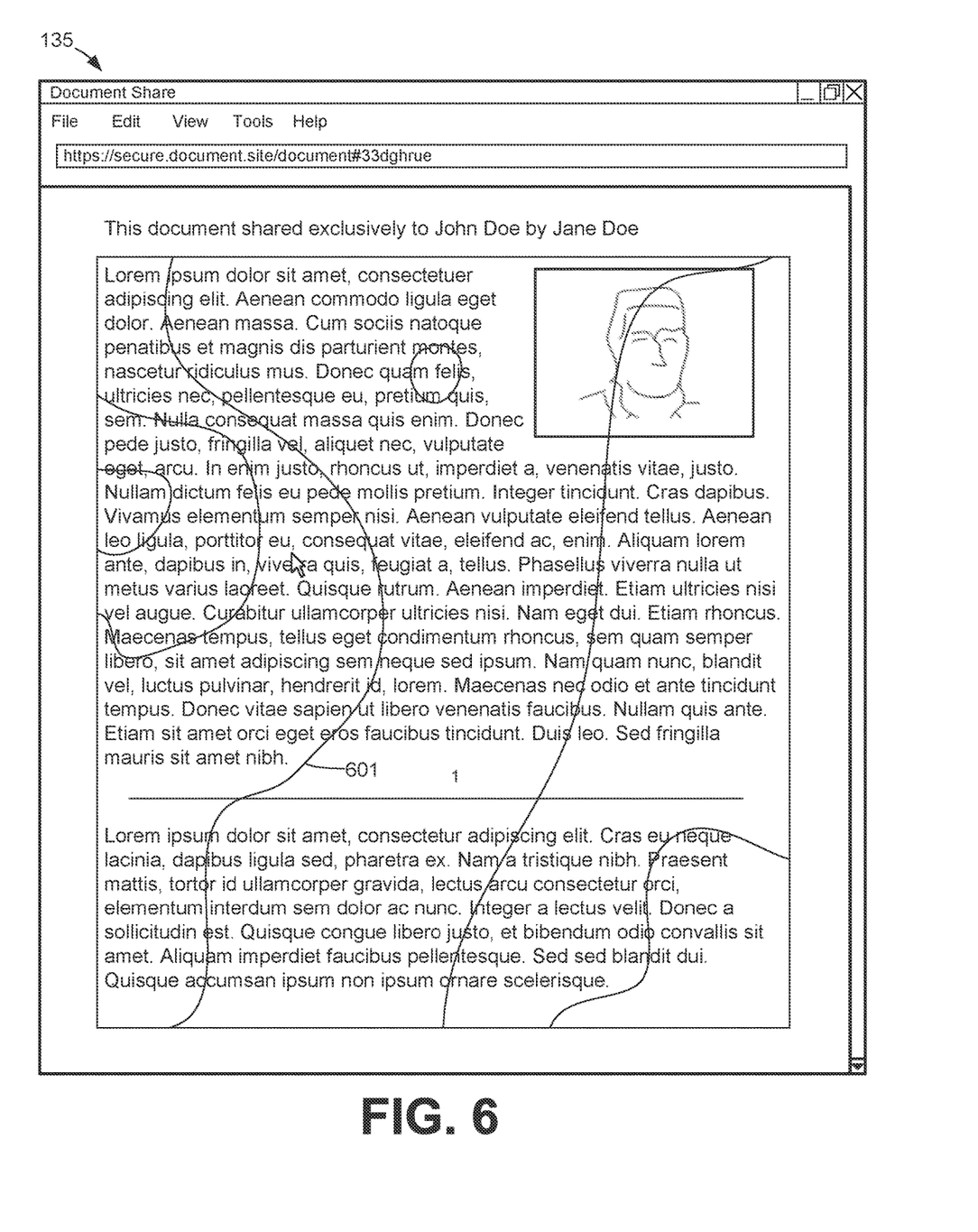

Continuing the example of FIG. 5, reference is now made to FIG. 6, which illustrates another example user interface 135 that can be rendered by a content rendering application 129 executed by a client device 106, 107 according to various embodiments of the disclosure. The user interface 135 shown in FIG. 6 also corresponds to the document representation 127 rendered by the content rendering application 129 in response to the sharing of a document by one user to another user via the document sharing application 116. The example of FIG. 6 illustrates an example of a security restriction that may be associated with the document representation 127 of a document that is rendered by a content rendering application 129. FIG. 6 illustrates an example of a watermark layer 601 that is incorporated along with the content of the document that is being shown in the user interface 135. The watermark layer 601 is overlaid onto the document content that is shown in the user interface 135 rendered by the content rendering application 129 corresponding to the document representation 127.

The watermark layer 601 shown in FIG. 6 is a unique watermark that can be associated with the destination to which the document is shared. In this way, should the document be printed and/or captured from the user interface 135 and then redistributed, a presence of a unique watermark layer may facilitate tracing of a source of an unauthorized redistribution of the document. The watermark layer 601 includes one or more lines overlaid onto the document within the user interface 135 that form a unique pattern that can be identified should the document be photographed, printed or otherwise redistributed without authorization. In some embodiments, the unique watermark layer 601 can resemble a wood grain or a wave pattern that can be associated with the particular request to share a particular document via the document sharing application 116.

Figure 7:
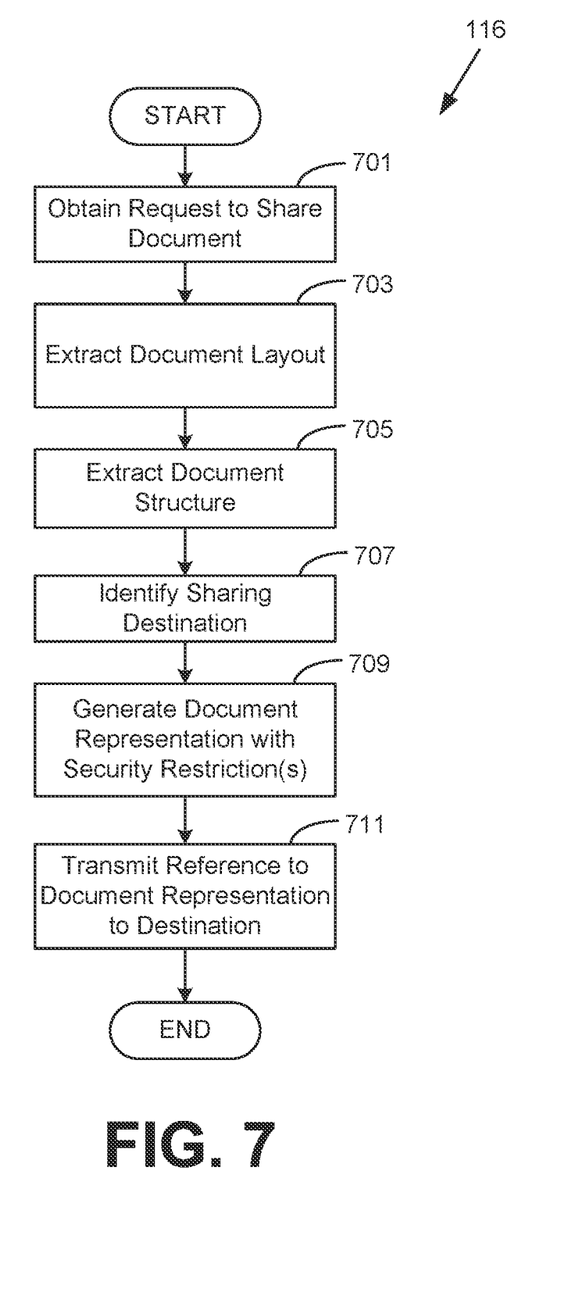
FIG. 7 is a flowchart illustrating one example of functionality implemented as portions of agent application executed in a computing environment in the networked environment of FIG. 1 according to various embodiments of the present disclosure.

Referring next to FIG. 7, shown is a flowchart that provides one example of the operation of a portion of the document sharing application 116 according to various embodiments. It is understood that the flowchart of FIG. 7 provides merely an example of the many different types of functional arrangements that may be employed to implement the operation of the portion of the document sharing application 116 as described herein. As an alternative, the flowchart of FIG. 7 may be viewed as depicting an example of elements of a method implemented in the computing environment 103 (FIG. 1) according to one or more embodiments.

Beginning with box 701, the document sharing application 116 obtains a request to share a document from a user of the enterprise. In some embodiments, the user may not be associated with an enterprise or an organization, but may rather simply be associated with a particular user account within the computing environment 103. At box 703, the document sharing application 116 can extract the document layout associated with the document file 123. At box 705, the document sharing application 116 can extract the document structure associated with the document file 123. At box 707, the document sharing application 116 can identify a destination with which the document is shared. In some embodiments, the destination can comprise an email address. In other embodiments, the destination may comprise another form of user identifier with which a user to whom the document is shared can be identified.

At box 709, the document sharing application 116 can generate a document representation 127 associated with the document based upon the document layout and the document structure. As noted above, a document representation 127 can include a security restrictions that restricts use of a portion of the document associated with the document representation 127 of the document. At box 711, the document sharing application 116 can transmit a reference to the document representation 127, such as a hyperlink, to the destination associated with the request to share the document. In some embodiments, the document sharing application 116 need not generate a new document representation 127 with each request to share a particular document. In some embodiments, the document sharing application 116 may generate a document representation 127 associated with a document when a user creates a particular document or initiates storage of a document in the data store 113 and create a reference to the document representation 127 upon receiving a request to share the document with another user. Thereafter, the process shown in FIG. 7 ends.

Figure 8:
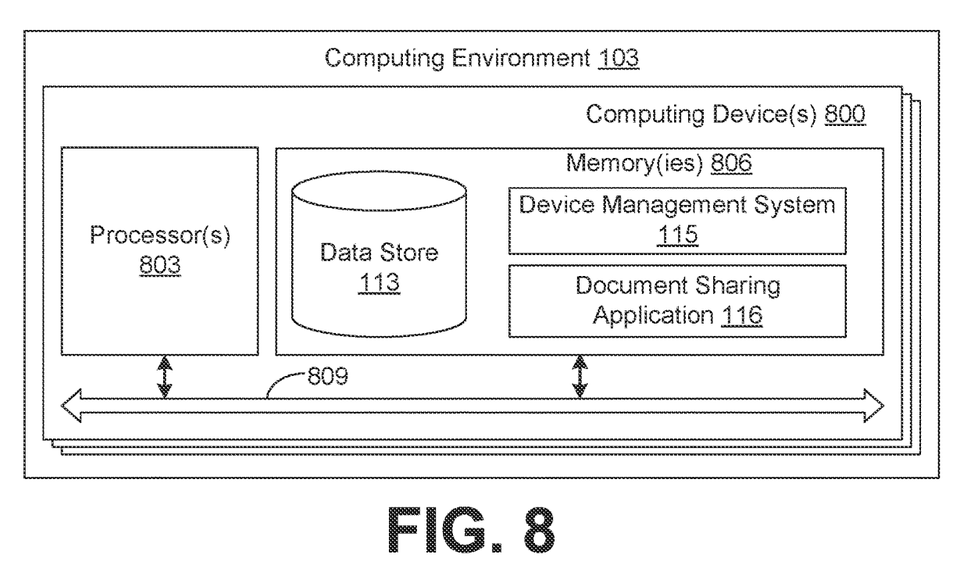
FIG. 8 is a schematic block diagram that provides one example illustration of a computing environment employed in the networked environment of FIG. 1 according to various embodiments of the present disclosure.

With reference to FIG. 8, shown is a schematic block diagram of the computing environment 103 according to an embodiment of the present disclosure. The computing environment 103 includes one or more computing devices 800. Each computing device 800 includes at least one processor circuit, for example, having a processor 803 and a memory 806, both of which are coupled to a local interface 809. As such, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the device management system 115, the document sharing application 116, and potentially other applications. Also stored in the memory 806 may be a data store 113 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the device management system 115, the document sharing application 116, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 7 shows an example of the functionality and operation of an implementation of portions of the document sharing application 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more successive blocks shown in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the document sharing application 116, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM), dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the document sharing application 116, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800 and/or client device 106, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed by the computing device, being configured to cause the computing device to at least:

obtain a first request to share a document with a destination on behalf of a user account;

extract a document layout and a document structure from the document, the document layout defining a visual layout of content of the document and the document structure defining a logical structure of the content of the document;

identify a compliance rule associated with at least one of the user account or the document, wherein the compliance rule specifies applying a security restriction to the document;

receive a second request from a client device to access the document, wherein the client device is associated with the destination;

determine that a context of the second request complies with the compliance rule;

generate a document representation of the document according to the security restriction in response to the context complying with the compliance rule, wherein the document representation is based on the document layout and the document structure; and     transmit a reference to the document representation to the destination, wherein upon activation, the reference activates client-side code to display the document representation based on a device property associated with the client device.

2. The non-transitory computer-readable medium of claim 1, wherein applying the security restriction further causes the computing device to at least:
remove textual content in the document representation based on identifying a keyword that is included prior to the textual content in the document, wherein the textual content is labeled as not permitted for redistribution.

3. The non-transitory computer-readable medium of claim 1, wherein the device property comprises at least one of a display resolution, a display device, or a browser version.

4. The non-transitory computer-readable medium of claim 1, wherein determining the context of the second request complies with the compliance rule further comprises determining that the second request is within an authorized time window.

5. The non-transitory computer-readable medium of claim 1, wherein the client-side code comprises a scripting language interpreted by a browser.

6. The non-transitory computer-readable medium of claim 1, wherein the security restriction comprises enforcing a limitation on root access privileges for an operating system of the client device.

7. The non-transitory computer-readable medium of claim 1, wherein the security restriction comprises a command for the client device to communicate with a management system within a specified amount of time, wherein the management system manages an operating system of the client device.

8. A system, comprising:
a computing device;
programming code executable in the computing device, the programming code causing the computing device to at least:
obtain a first request to share a document with a destination on behalf of a user account;
extract a document layout and a document structure from the document, the document layout defining a visual layout of content of the document and the document structure defining a logical structure of the content of the document;
identify a compliance rule associated with at least one of the user account or the document, wherein the compliance rule specifies applying a security restriction to the document;
receive a second request from a client device to access the document, wherein the client device is associated with the destination;
determine that a context of the second request complies with the compliance rule;
generate a document representation of the document according to the security restriction in response to the context complying with the compliance rule, wherein the document representation is based on the document layout and the document structure; and
transmit a reference to the document representation to the destination, wherein upon activation, the reference activates client-side code to display the document representation based on a device property associated with the client device.

9. The system of claim 8, wherein applying the security restriction further causes the computing device to at least:
remove textual content in the document representation based on identifying a keyword that is included prior to the textual content in the document, wherein the textual content is labeled as not permitted for redistribution.

10. The system of claim 8, wherein the device property comprises at least one of a display resolution, a display device, or a browser version.

11. The system of claim 8, wherein determining the context of the second request complies with the compliance rule further comprises determining that the second request is within an authorized time window.

12. The system of claim 8, wherein the client-side code comprises a scripting language interpreted by a browser.

13. The system of claim 8, wherein the security restriction comprises enforcing a limitation on root access privileges for an operating system of the client device.

14. The system of claim 8, wherein the security restriction comprises a command for the client device to communicate with a management system within a specified amount of time, wherein the management system manages an operating system of the client device.

15. A method, comprising:
obtaining, by a computing device, a first request to share a document with a destination on behalf of a user account;
extracting, by the computing device, a document layout and a document structure from the document, the document layout defining a visual layout of content of the document and the document structure defining a logical structure of the content of the document;
identifying, by the computing device, a compliance rule associated with at least one of the user account or the document, wherein the compliance rule specifies applying a security restriction to the document;
receiving, by the computing device, a second request from a client device to access the document, wherein the client device is associated with the destination;
determining, by the computing device, that a context of the second request complies with the compliance rule;
generating, by the computing device, a document representation of the document according to the security restriction in response to the context complying with the compliance rule, wherein the document representation is based on the document layout and the document structure; and
transmitting, by the computing device, a reference to the document representation to the destination, wherein upon activation, the reference activates client-side code to display the document representation based on a device property associated with the client device.

16. The method of claim 15, wherein applying the security restriction further comprises:
removing textual content in the document representation based on identifying a keyword that is included prior to the textual content in the document, wherein the textual content is labeled as not permitted for redistribution.

17. The method of claim 15, wherein the device property comprises at least one of a display resolution, a display device, or a browser version.

18. The method of claim 15, wherein determining the context of the second request complies with the compliance rule further comprises determining that the second request is within an authorized time window.

19. The method of claim 15, wherein the client-side code comprises a scripting language interpreted by a browser.

20. The method of claim 15, wherein the security restriction comprises enforcing a limitation on root access privileges for an operating system of the client device.

* * * * *